(12) United States Patent
Um et al.

(10) Patent No.: US 9,259,855 B2
(45) Date of Patent: Feb. 16, 2016

(54) DIAMOND TOOL

(76) Inventors: Tae Ung Um, Cerritos, CA (US);
Hongsang Rho, Edmonton (CA)

( * ) Notice: Subject to any disclaimer, the term of this patent is extended or adjusted under 35 U.S.C. 154(b) by 1053 days.

(21) Appl. No.: 13/182,429

(22) Filed: Jul. 13, 2011

(65) Prior Publication Data

US 2013/0014739 A1  Jan. 17, 2013

(51) Int. Cl.
*B28D 1/12* (2006.01)
*B24D 5/06* (2006.01)
*B23D 61/04* (2006.01)

(52) U.S. Cl.
CPC ............. *B28D 1/121* (2013.01); *B23D 61/04* (2013.01); *B24D 5/06* (2013.01)

(58) Field of Classification Search
CPC ........ B23D 61/02; B24D 5/06; B24D 99/005; B26D 1/006; B27B 5/00; B28D 1/04; B28D 1/121; B28D 1/24
USPC .......... 125/15, 18, 22; 407/118; 451/546, 547
See application file for complete search history.

(56) References Cited

U.S. PATENT DOCUMENTS

| 2,092,591 | A | * | 9/1937 | Sohlstrom | 451/546 |
| 3,850,590 | A | * | 11/1974 | Chalkley et al. | 51/298 |
| 4,883,500 | A | * | 11/1989 | Deakins et al. | 51/298 |
| 5,011,511 | A | * | 4/1991 | Beck | 51/295 |
| 5,584,896 | A | * | 12/1996 | Broberg et al. | 51/295 |
| 6,615,816 | B2 | * | 9/2003 | Ogata | 125/15 |
| 8,360,046 | B2 | * | 1/2013 | Kim et al. | 125/15 |
| 2005/0249560 | A1 | * | 11/2005 | Lee et al. | 407/118 |
| 2014/0239148 | A1 | * | 8/2014 | Boden et al. | 249/203 |

* cited by examiner

*Primary Examiner* — Timothy V Eley
(74) *Attorney, Agent, or Firm* — Chanmin Park

(57) ABSTRACT

A diamond tool comprises a circular core plate and a peripherally attached cutting segment. The cutting segment comprises a plurality of abrasive particles, a holding body that holds the abrasive particles, and a plurality of non-abrasive inserts. The abrasive particles are dispersed within the holding body and the non-abrasive inserts are embedded in the holding body. The non-abrasive inserts are sized and distributed so that the peripheral average density of the abrasive particles in the holding body of the cutting segment varies across the peripheral edge in discrete steps or continuously.

20 Claims, 8 Drawing Sheets

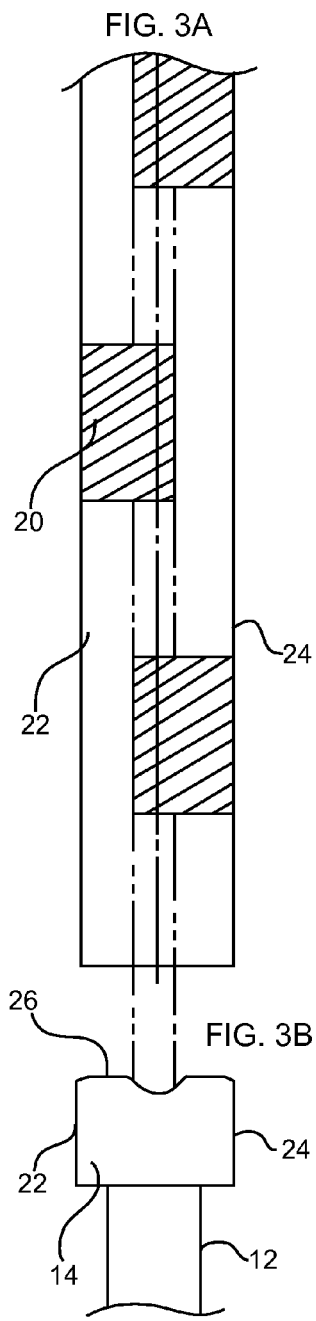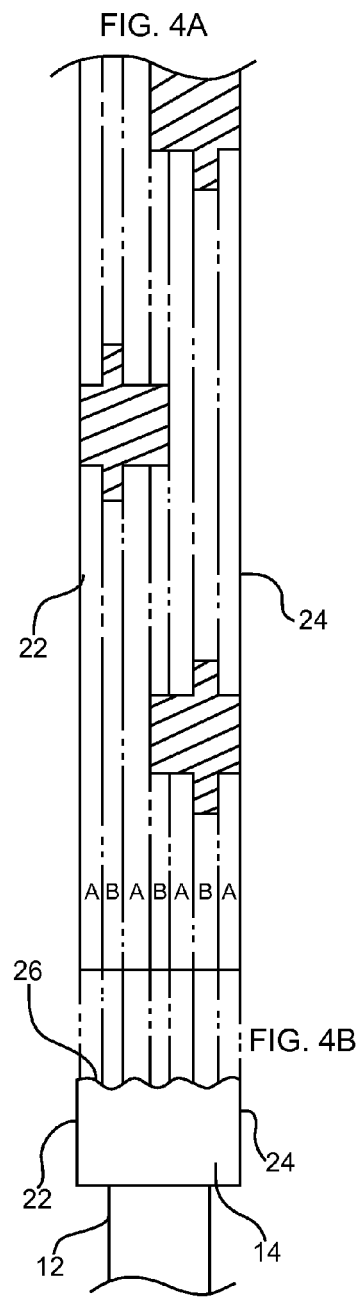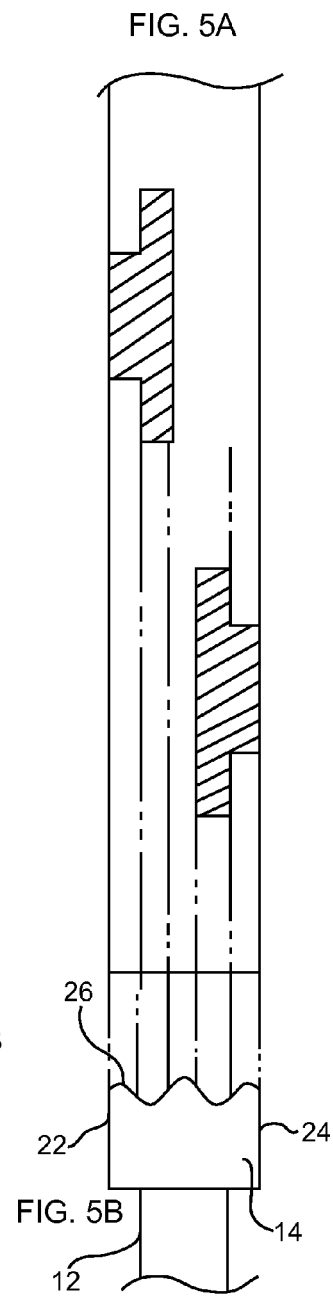

DIAMOND TOOL

BACKGROUND OF THE INVENTION

1. Field of the Invention

The invention is related to a diamond tool. More particularly, the present invention is related to a rotating diamond blade that is used to cut hard material such as granite, tiles, concrete, asphalt and so on.

2. Description of the Prior Art

Diamond tools comprise numerous artificially-made diamond particles embedded in a soft material, which is usually metal. A diamond tool blade provided in a form of rotating saw disc is widely used at building sites, to cut hard and brittle construction material including ceramic tiles and stone slabs. A diamond tool blade is a disposable part, as the diamond particles are consumed and removed from the blade during cutting process. Speed, accuracy and efficiency of cutting and service life of the blade depend heavily on proper distribution of diamond particles in the blade.

One approach by prior art is the turbo blade. It includes repetition of a cutting block and a blank space back to back along the periphery of a blade disk. The cutting blocks are provided in staggered fashion along both sides of the periphery. The turbo blade has advantages in manufacturing small, portable diamond blades and high cutting speed. A disadvantage of the turbo blade is that it incurs substantial vibration during cutting process and the cut surface is not smooth. In addition, the accuracy of cut material is low and often requires additional finishing operation.

Another prior art blade comprises multiple layers of sintered metal powder and diamond particles arranged on the surface of and between the layers. The layers are provided on the rim of a blade disc. This structure provides efficient arrangement of diamond particles and enhances speed and accuracy of cutting, and service life of the blade. However, this layered blade has disadvantages that it requires expensive manufacturing devices and only suitable for larger and thicker segmented blades due to its structural complexity.

A new portable diamond tool blade, which is economic, durable and provides fast and accurate cutting of stone or ceramic materials, has long been in need.

SUMMARY OF THE INVENTION

An objective of the invention is to provide a diamond tool that has longer service life. Another objective of the invention is to provide a diamond tool that has lower manufacturing cost. Still another objective of the invention is to provide a diamond tool that can cut brittle material in precision.

In order to achieve the objectives, the present invention provides a diamond tool comprising a circular core plate and a cutting segment attached to the periphery of the circular core plate. The cutting segment comprises a plurality of abrasive particles, a holding body that holds the abrasive particles, and a plurality of non-abrasive inserts. The abrasive particles are dispersed within the holding body and the non-abrasive inserts are embedded in the holding body. The hardness of the abrasive particles is bigger than the hardness of the holding body. The circular core plate and the cutting segment have substantially flat and thin shape. The cutting segment comprises a first surface, a second surface opposite to the first surface, and a peripheral edge connecting the first surface and the second surface. The non-abrasive inserts are substantially evenly distributed in the holding body.

In the first embodiment, the non-abrasive inserts comprise a first set of inserts that are embedded flush with the first surface, and a second set of inserts that are embedded flush with the second surface. The first set of inserts are staggered with the second set of inserts along the peripheral edge of the cutting segment. The cross-section of the non-abrasive insert in radial direction of the cutting segment is rectangular.

In the second embodiment, the peripheral average density of the abrasive particles in the holding body of the cutting segment varies across the peripheral edge in the direction from the first surface to the second surface in discrete steps. The peripheral average density is amount of abrasive particles per unit volume along one discrete step around the whole periphery of the cutting segment. The peripheral average density varies between adjacent discrete steps by predetermined magnitude. The peripheral average density is controlled by the number and dimension of the non-abrasive inserts. Preferably, the predetermined magnitude is in a range from about 0.3 ct/cc to about 0.4 ct/cc. Preferably, the abrasive particles are made of diamond, the holding body is made of sintered powder metal, and the non-abrasive inserts are made of ferrous or non-ferrous metal. In this embodiment, the number of the discrete steps cutting segment is three (3). Preferably, the cross-section of the non-abrasive insert in radial direction of the cutting segment is rectangular.

In the third embodiment, the number of the discrete steps cutting segment is five (5). Preferably, the cross-section of the non-abrasive insert in radial direction of the cutting segment is T-shaped.

In the fourth embodiment, the number of the discrete steps cutting segment is seven (7). Preferably, the cross-section of the non-abrasive insert in radial direction of the cutting segment is cross-shaped.

In the fifth embodiment, the peripheral average density of the abrasive particles in the holding body of the cutting segment varies across the peripheral edge in the direction from the first surface to the second surface continuously. Preferably, the cross-section of the non-abrasive insert in radial direction of the cutting segment has triangular shape.

The cutting segment may preferably comprise a plurality of segment blocks.

The advantageous effects of the present invention are: (1) the diamond tool has faster speed and longer service life because its abrasive particles are effectively used before they fall off; (2) the diamond tool can be made at much lower cost than present pattern blades due to its simple structure; (3) the diamond tool provide cut surface in accurate dimension because the cutting segment contacts the surface to be cut continuously.

BRIEF DESCRIPTION OF THE DRAWINGS

The accompanying drawings illustrate the best embodiments of the present invention. In the drawings:

FIG. 3A is a front elevation view showing a diamond tool blade according to the second embodiment of the present invention;

FIG. 3B is a side elevation view of the diamond tool;

FIG. 4A is a front elevation view showing a diamond tool blade according to the third embodiment of the present invention;

FIG. 4B is a side elevation view of the diamond tool;

FIG. 5A is a front elevation view showing a diamond tool blade according to the fourth embodiment of the present invention;

FIG. 5B is a side elevation view of the diamond tool;

DESCRIPTION OF PREFERRED EMBODIMENTS

Figure 1A:
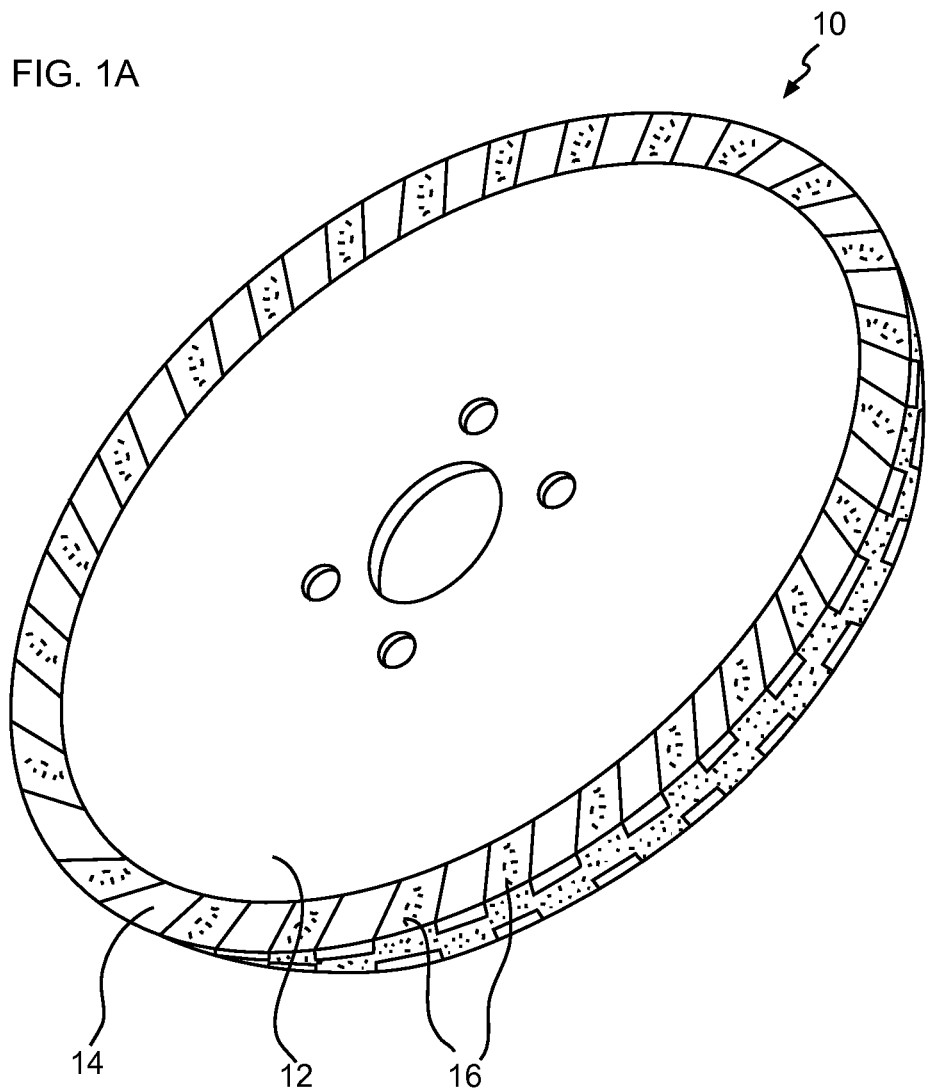
FIG. 1A is a perspective view showing a diamond tool blade according to the first embodiment of the present invention.
Figure 1B:
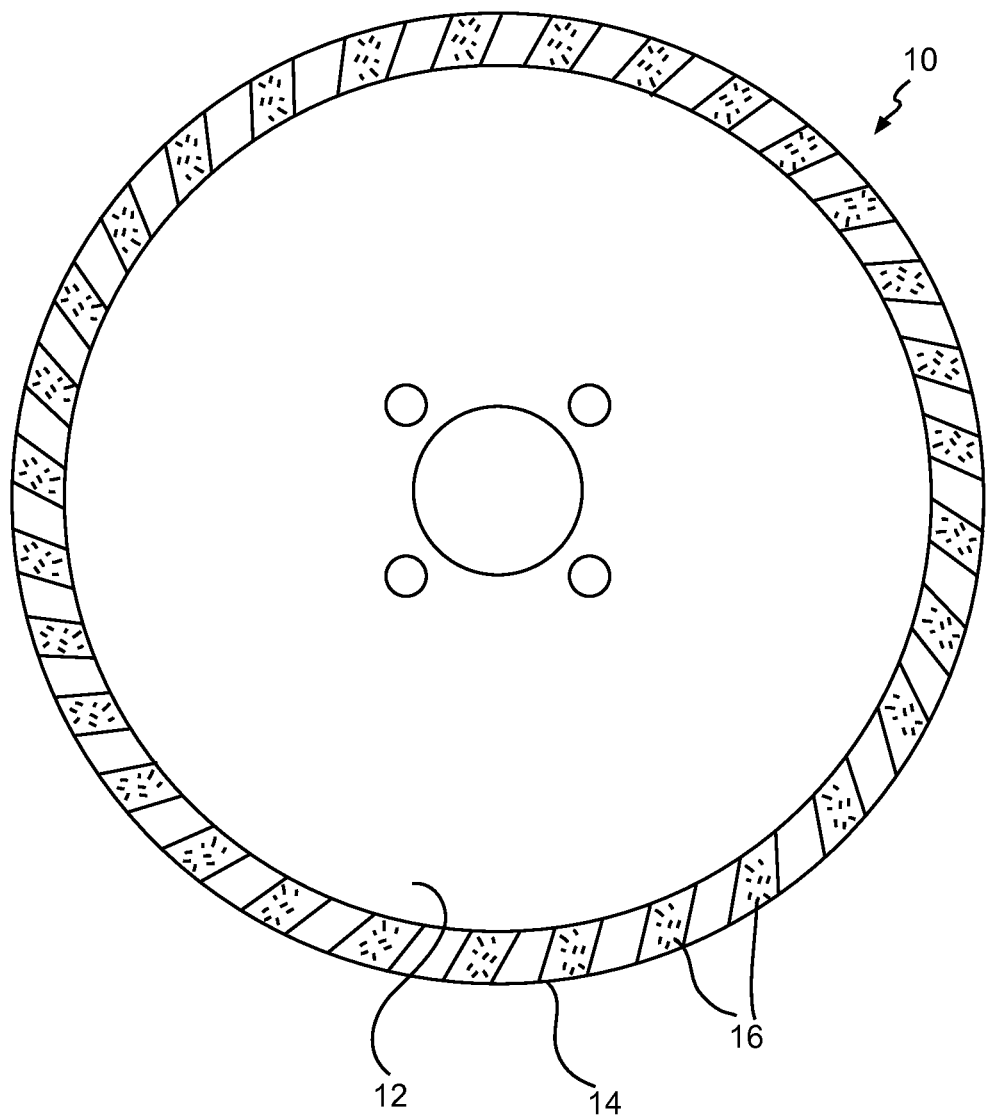
FIG. 1B is a front elevation view showing of the diamond tool.
Figure 2:
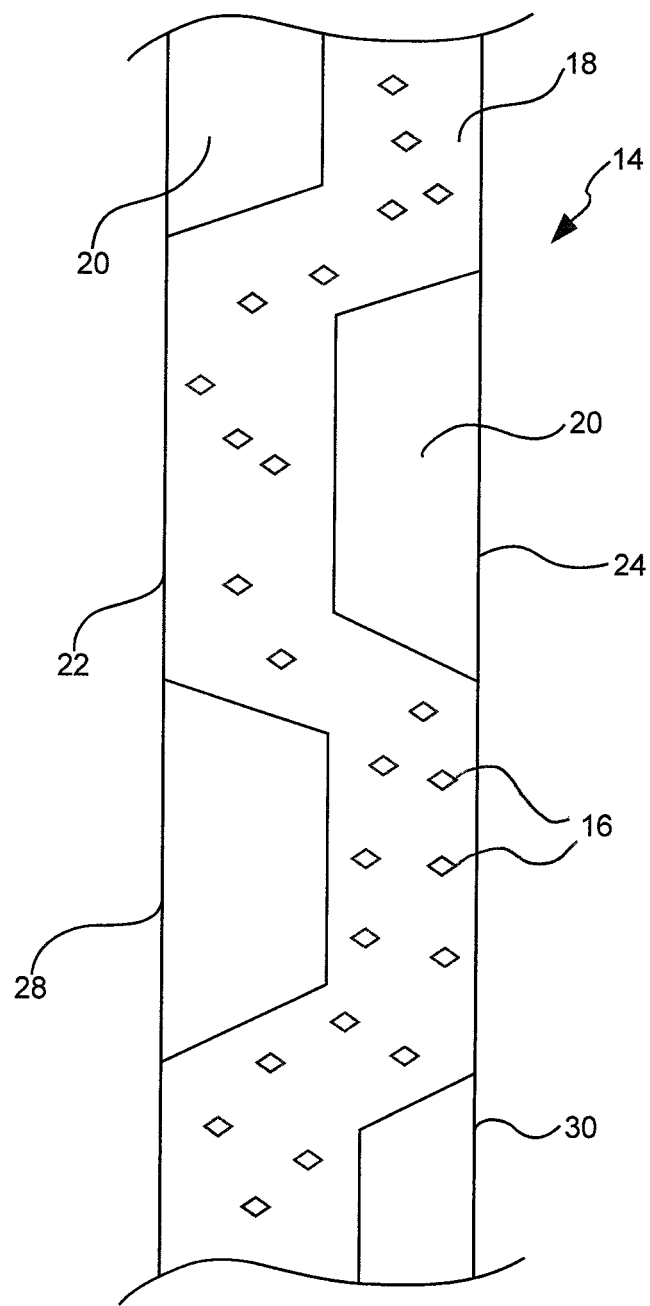
FIG. 2 is a partial, enlarged, side elevation view of the diamond tool.

FIGS. 1A and 1B show a diamond tool 10 comprising a circular core plate 12 and a cutting segment 14 attached to the periphery of the circular core plate 12. FIG. 2 shows that the cutting segment 14 comprises a plurality of abrasive particles 16, a holding body 18 that holds the abrasive particles 16, and a plurality of non-abrasive inserts 20. The abrasive particles 16 are dispersed within the holding body 18 and the non-abrasive inserts 20 are embedded in the holding body 18. The hardness of the abrasive particles 20 is bigger than the hardness of the holding body 18. The hardness of the non-abrasive inserts 20 is about the same or less than the hardness of the holding body 18. The circular core plate 12 and the cutting segment 14 have substantially flat and thin shape. As shown in FIG. 3A, the cutting segment 14 comprises a first surface 22, a second surface 24 opposite to the first surface 22, and a peripheral edge 26 connecting the first surface and the second surface. The non-abrasive inserts 20 are substantially evenly distributed in the holding body 18.

FIGS. 1A, 1B and 2 show the first embodiment, in which the non-abrasive inserts 20 comprise a first set 28 of inserts that are embedded flush with the first surface 22, and a second set of inserts 30 that are embedded flush with the second surface 24. The first set of inserts 28 are staggered with the second set of inserts 30 along the peripheral edge 26 of the cutting segment 14. As shown in FIG. 2, the cross-section of the non-abrasive insert 20 in radial direction of the cutting segment is rectangular. The non abrasive inserts 20 prevents a workpiece, which is being cut, from impacting the abrasive particles 16 in a large angle, and guides the workpiece to impact the abrasive particles 16 in smaller angle. This scheme reduces chipping during cut operation, and decreases premature falling of the abrasive particles 16 thereby increasing the service life of the diamond tool 10.

FIGS. 3A and 3B show the second embodiment, in which the peripheral average density of the abrasive particles in the holding body 18 of the cutting segment 14 varies across the peripheral edge 26 in the direction from the first surface 22 to the second surface 24 in discrete steps. The peripheral average density is amount of abrasive particles 16 per unit volume along one discrete step around the whole periphery of the cutting segment 14.

The peripheral average density varies between adjacent discrete steps by predetermined magnitude. The peripheral average density is controlled by the number and dimension of the non-abrasive inserts 20. In the preferred embodiments, the predetermined magnitude is in a range from about 0.3 ct/cc to about 0.4 ct/cc. The abrasive particles 16 are made of diamond. The holding body 18 is made of sintered powder metal. The non-abrasive inserts 20 are made of metal. This structure minimizes falling of under-used diamond particles, thereby increasing the service life of the diamond tool and efficiency and accuracy of cutting.

In the second embodiment, the number of the discrete steps cutting segment is three (3). As shown in FIG. 3A, the cross-section of the non-abrasive insert 20 in radial direction of the cutting segment 14 is rectangular.

FIGS. 4A and 4B show the third embodiment, in which the number of the discrete steps cutting segment is five (5). As shown in FIG. 4A, the cross-section of the non-abrasive insert 20 in radial direction of the cutting segment 14 is T-shaped.

FIGS. 5A and 5B show the fourth embodiment, in which the number of the discrete steps cutting segment is seven (7). As shown in FIG. 5A, the cross-section of the non-abrasive insert 20 in radial direction of the cutting segment 14 is cross-shaped.

The cutting segment may be provided as a plurality of segment blocks 30 arranged in the periphery of the diamond tool 10. The cutting segment 14 with the segment blocks 30 is an improvement of a cutting element generally known as the turbo type sandwich segment. FIGS. 6~10 show recommended shape and dimensions of the segment blocks 30.

Figure 6:
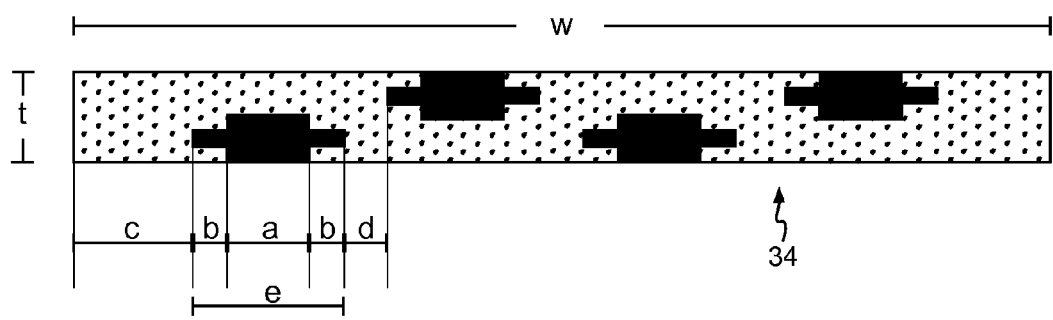
FIG. 6 is a schematic sectional view of a segment block.

FIG. 6 shows an example of a segment block 34. The dimensions for the segment block 34 and the non-abrasive inserts are optimized for best result and ease of manufacturing.

Figure 7:
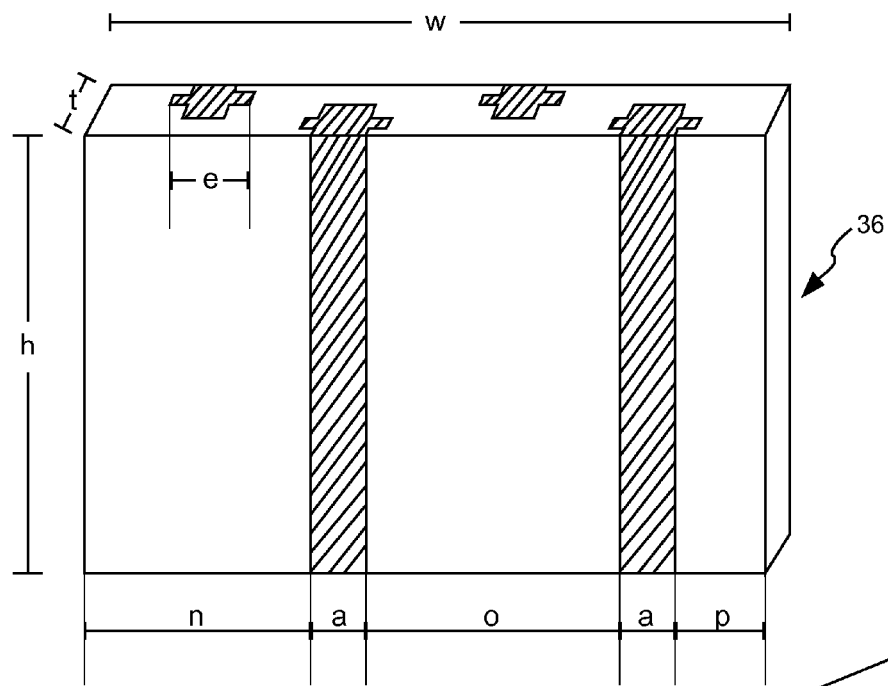
FIG. 7 is a perspective view of the segment block.
Figure 8:
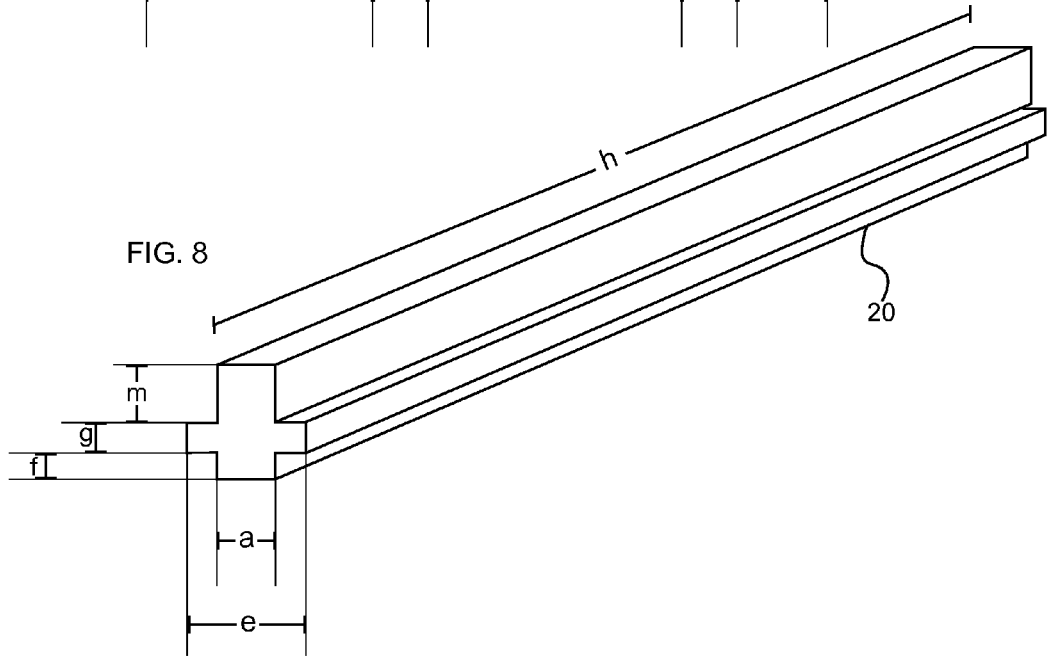
FIG. 8 is a perspective view of a non-abrasive insert.

FIGS. 7 and 8 show another example of a segment block 36. The dimensions for the segment block 36 and the non-abrasive inserts are optimized for best result and ease of manufacturing.

Figure 9:
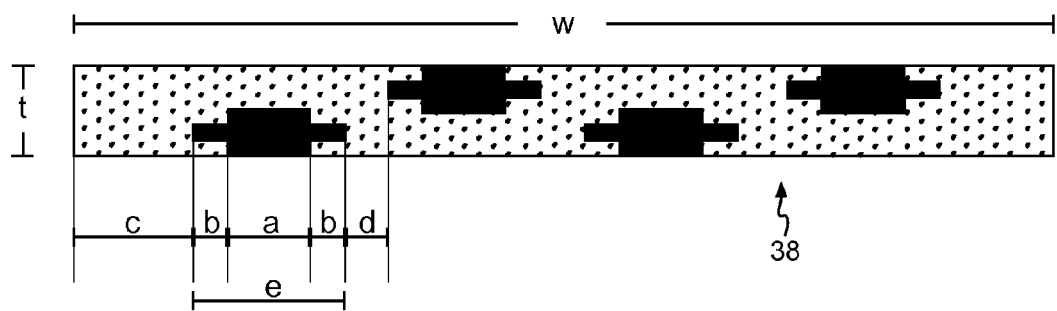
FIG. 9 is a schematic sectional view of another segment block.
Figure 10:
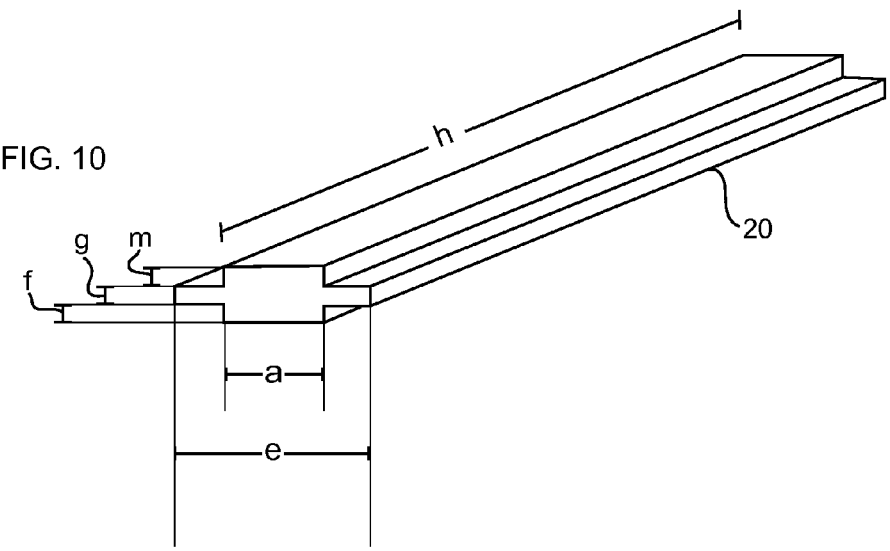
FIG. 10 is a perspective view of another non-abrasive insert.

FIGS. 9 and 10 show another example of a segment block 38. The dimensions for the segment block 38 and the non-abrasive inserts are optimized for best result and ease of manufacturing.

Figure 11A:
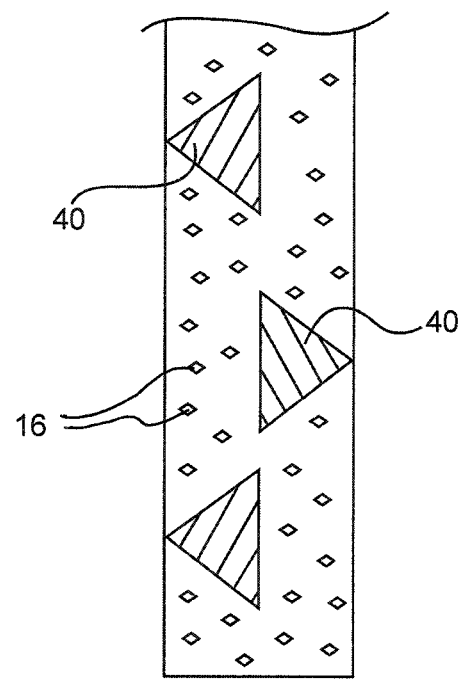
FIG. 11A is a front elevation view showing a diamond tool blade according to the fifth embodiment of the present invention.
Figure 11B:
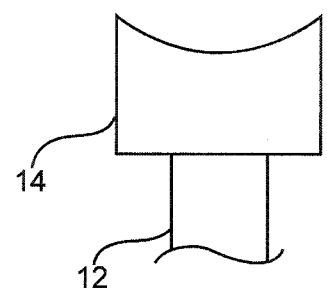
FIG. 11B is a side elevation view of the diamond tool.

FIGS. 11A and 11B show the fifth embodiment, in which the peripheral average density of the abrasive particles in the holding body of the cutting segment varies across the peripheral edge in the direction from the first surface to the second surface continuously. As shown in FIG. 11A, the cross-section of non-abrasive inserts 40 in radial direction of the cutting segment 14 has triangular shape. The non-abrasive inserts 40 are arranged oppositely in the holding body 18 to facilitate manufacturing. The cross-section of the diamond tool during use becomes a concave shape as shown in FIG. 11B. In this embodiment, the peripheral average density is amount of abrasive particles per unit volume along a circumference within the peripheral edge Apexes of the non-abrasive inserts in the first set of inserts are substantially flush with the first surface. Apexes of the non-abrasive inserts in the second set of inserts are substantially flush with the second surface. Bases of the non-abrasive inserts are substantially aligned.

The diamond tool of the present invention is applied to any form of rotating diamond tool, such as a cup wheel, core drill bit, finger bit and router bit in addition to saw blades.

The invention claimed is:

1. A diamond tool comprising:
   a) a circular core plate; and
   b) a cutting segment attached to the periphery of the circular core plate;
   wherein the cutting segment comprises a plurality of abrasive particles, a holding body that holds the abrasive particles, and a plurality of non-abrasive inserts, wherein the abrasive particles are dispersed within the holding body, wherein the non-abrasive inserts are embedded in the holding body, wherein the hardness of the abrasive particles is greater than the hardness of the holding body, wherein the circular core plate and the cutting segment have a substantially flat and thin shape, wherein the cutting segment comprises a first surface, a second surface opposite to the first surface, and a peripheral edge connecting the first surface and the second surface, wherein the cross-section of each of the non-abrasive inserts in an axial direction of the cutting segment has a triangular shape, wherein the non-abrasive inserts comprise a first set of inserts that is embedded flush with the first surface, and a second set of inserts that is embedded flush with the second surface, wherein apexes of the non-abrasive inserts in the first set of inserts are substantially flush with the first surface, and apexes of the non-abrasive inserts in the second set of inserts are substantially flush with the second surface, and wherein bases of the non-abrasive inserts are substantially aligned.

2. The diamond tool of claim 1, wherein the first set of inserts is staggered with the second set of inserts along the peripheral edge of the cutting segment.

3. The diamond tool of claim 2, wherein the cross-section of the non-abrasive insert in a radial direction of the cutting segment is rectangular.

4. The diamond tool of claim 3, wherein the abrasive particles are made of diamond, wherein the holding body is made of sintered powder metal, wherein the non-abrasive inserts are made of metal.

5. The diamond tool of claim 3, wherein the non-abrasive inserts are substantially evenly distributed in the holding body.

6. The diamond tool of claim 1, wherein peripheral average density of the abrasive particles in the holding body of the cutting segment varies across the peripheral edge in the direction from the first surface to the second surface in discrete steps, wherein the peripheral average density is the amount of abrasive particles per unit volume along one discrete step around the whole periphery of the cutting segment.

7. The diamond tool of claim 6, wherein the peripheral average density varies between adjacent discrete steps by predetermined magnitude.

8. The diamond tool of claim 7, wherein the peripheral average density is controlled by the number and size of the non-abrasive inserts.

9. The diamond tool of claim 8, wherein the predetermined magnitude is in a range from about 0.3 ct/cc to about 0.4 ct/cc.

10. The diamond tool of claim 9, the abrasive particles are made of diamond, wherein the holding body is made of sintered powder metal, wherein the non-abrasive inserts are made of metal.

11. The diamond tool of claim 9, wherein the non-abrasive inserts are substantially evenly distributed in the holding body.

12. The diamond tool of claim 8, wherein the number of the discrete steps is three (3), wherein the cross-section of the non-abrasive insert in a radial direction of the cutting segment is rectangular.

13. The diamond tool of claim 8, wherein the number of the discrete steps is five (5), wherein the cross-section of the non-abrasive insert in radial direction of the cutting segment is T-shaped.

14. The diamond tool of claim 8, wherein the number of the discrete steps is seven (7), wherein the cross-section of the non-abrasive insert in radial direction of the cutting segment is cross-shaped.

15. The diamond tool of claim 6, wherein the cutting segment comprises a plurality of segment blocks.

16. The diamond tool of claim 1, wherein peripheral average density of the abrasive particles in the holding body of the cutting segment varies across the peripheral edge in a direction from the first surface to the second surface continuously, wherein the direction is parallel with the axis of the diamond tool.

17. The diamond tool of claim 16, wherein the cutting segment comprises a plurality of segment blocks.

18. The diamond tool of claim 16, wherein the peripheral average density is controlled by the number and size of the non-abrasive inserts.

19. The diamond tool of claim 18, wherein the non-abrasive inserts are substantially evenly distributed in the holding body.

20. The diamond tool of claim 19, wherein the abrasive particles are made of diamond, wherein the holding body is made of sintered powder metal, wherein the non-abrasive inserts are made of metal.

* * * * *